(12) United States Patent
Mousseau et al.

(10) Patent No.: US 6,687,251 B1
(45) Date of Patent: Feb. 3, 2004

(54) METHOD AND APPARATUS FOR DISTRIBUTED MTP LEVEL 2 ARCHITECTURE

(75) Inventors: Guy G. Mousseau, Hull (CA); John H. Yoakum, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/456,560

(22) Filed: Dec. 8, 1999

(51) Int. Cl.[7] ........................... H04L 12/28; H04L 12/56
(52) U.S. Cl. ..................... 370/401; 370/410; 370/467
(58) Field of Search ................................. 370/352–356, 370/401, 402, 410, 466, 467, 465; 379/229, 230, 88.17

(56) References Cited

U.S. PATENT DOCUMENTS

| | | | | |
|---|---|---|---|---|
| 5,680,437 A | * | 10/1997 | Segal ........................ | 379/15.01 |
| 5,757,895 A | * | 5/1998 | Aridas et al. ................ | 379/136 |
| 5,923,659 A | * | 7/1999 | Curry et al. ................. | 370/401 |
| 5,940,598 A | * | 8/1999 | Strauss et al. ............... | 709/249 |
| 5,974,052 A | | 10/1999 | Johnson et al. .............. | 370/467 |
| 6,292,479 B1 | * | 9/2001 | Bartholomew et al. ...... | 370/352 |
| 6,324,183 B1 | * | 11/2001 | Miller et al. ................. | 370/467 |
| 6,377,799 B1 | * | 4/2002 | Hameleers et al. .......... | 455/426 |
| 6,427,071 B1 | * | 7/2002 | Adams et al. ............... | 455/403 |
| 6,434,140 B1 | * | 8/2002 | Barany et al. ............... | 370/352 |
| 6,523,068 B1 | * | 2/2003 | Beser et al. ................. | 709/238 |

OTHER PUBLICATIONS

Ong, L. et al. "Framework Architecture for Signaling Transport", Oct. 1999, pp 1–24.

* cited by examiner

*Primary Examiner*—Ricky Ngo
*Assistant Examiner*—Yvonne Q. Ha
(74) *Attorney, Agent, or Firm*—Withrow & Terranova, PLLC

(57) ABSTRACT

An apparatus and method for distributing the SS7 Message Transfer Part Level 2 (MTPL2) between a Media Gateway and a Signalling Gateway in a Voice over IP Switch is disclosed. The distribution of the MTP Level 2 stack allows data links in a fully associated SS7 network to be terminated on the Media Gateway and SS7 messages to be exchanged between the Media Gateway and the Signalling Gateway over an IP backbone.

11 Claims, 9 Drawing Sheets

METHOD AND APPARATUS FOR DISTRIBUTED MTP LEVEL 2 ARCHITECTURE

FIELD OF THE INVENTION

The present invention relates generally to SS7 signalling and more particularly to a method and apparatus for distributing the Message Transfer Part (MTP) Level 2 functionality between a Signalling Gateway and a Media Gateway.

BACKGROUND TO THE INVENTION

The following acronyms will be used throughout this document:

| | |
|---|---|
| AERM | Alignment Error Rate Monitor |
| ACK | Acknowledge |
| ACM | Address Complete Message |
| AM | AERM Monitoring |
| ANSI | American National Standards Institute |
| ATM | Asynchronous Transfer Mode |
| BERT | Bit Error Rate Testing |
| CC | Congestion Control |
| CCS | Common Channel Signalling |
| CRC | Cyclic Redundancy Check |
| DAEDR | Delimitation, Alignment, Error Detection Receive |
| DAEDT | Delimitation, Alignment, Error Detection Transmit |
| DL2P | Distributed L2 Protocol |
| DPS | Distributed Protocol Stack |
| EM | Emergency Monitoring |
| FISU | Fill-In Signal Unit, a signalling unit complying with MTPL2 |
| HDLC | High-Level Data Link Control |
| IAC | Initial Alignment Control |
| IAM | Initial Address Message |
| IN | Intelligent Network |
| INH | Inhibit |
| ISUP | ISDN User Part |
| ITU | International Telecommunication Union |
| LSC | Link State Control |
| LNP | Local Number Portability |
| LSSU | Link Status Signal Unit, a signalling unit complying with MTPL2 |
| LL-MTPL2 | Lower Level - Message Transfer Part Level 2, a portion of the Distributed MTP Level 2 Architecture |
| Mb/s | Megabit-per-second |
| MG | Media Gateway |
| MSU | Message Signal Unit, a signalling unit complying with MTPL2 |
| MTP | Message Transfer Part |
| MTPL1 | MTP Level 1 |
| MTPL2 | MTP Level 2 |
| MTPL3 | MTP Level 3 |
| OM | Operational Measurement (OM-MG Operational Measurement located at the Media Gateway, OM-SG Operational Measurement located at the Signalling Gateway) |
| OSI | Open Standards Interconnect |
| PSTN | Public Switched Telephone Network |
| RC | Receive Control (RC-SG Receive Control located at Signalling Gateway, RC-MG Receive Control located at Media Gateway) |
| REM | Remote |
| RTB | Re-Transmission Buffer |
| RTP | Reliable Transport Protocol |
| SCPs | Service Control Points |
| SG | Signalling Gateway |
| SIB | Status Indicator Busy (used by LSSUs) |
| SIE | Status Indicator Emergency (used by LSSUs) |
| SIF | Signalling Information Field |
| SIN | Status Indicator Normal (used by LSSUs) |
| SIO | Status Indicator Out of Alignment (used by LSSUs) |
| SIOS | Status Indicator Out of Service (used by LSSUs) |
| SIPO | Status Indicator Processor Outage (used by LSSUs) |
| SS7 | Signalling System 7 |
| SSPs | Service Switching Points |
| STPs | Signalling Transfer Points |
| SU | Signalling Unit |
| SUERM | Signalling Unit Error Rate Monitor |
| TB | Transmission Buffer |
| TDM | Time Division Multiplexed |
| TXC | Transmit Control (TCX-SG Transmit Control located at Signalling Gateway; TCX-MG Transmit Control located at Media Gateway) |
| UL-MTPL2 | Upper Level - Message Transfer Part Level 2, a portion of the Distributed MTP Level 2 Architecture |
| UDP | User Datagram Protocol |
| UNI | Un-Inhibit |
| VoIP | Voice over IP |

A Public Switched Telephone Network (PSTN) is, conventionally, comprised of two networks—a voice/data network and a signalling network. The signalling network carries information for call set-up and tear down. The Common Channel Signalling System #7 (CC-SS7) protocol is used for call set-up and tear down.

As is known in the art, the PSTN provides users with a dedicated, end-to-end circuit connection for the duration of each call. The circuits are reserved between the originating call, tandem switches (if any), and the terminating switch based on the called party number. In a typical Intelligent Network (IN), such as the North American SS7 network, to set-up a basic call circuit between a calling party at a first Service Switching Point (SSP), and a called party, having an out-of-switch number (i.e., the called party is at a second SSP), SS7 messages are exchanged between the two SSPs using the SS7 network.

Recent developments, notably the popularity of the Internet, have increased the use of Voice over IP (VoIP) communication. Voice over IP switches need to interface to the existing PSTN networks (voice and signalling) to allow PSTN phones to use the VoIP network. A VoIP switch would interface to the PSTN Voice network using a Media Gateway. The Media Gateway provides the translation between Time Division Multiplexed (TDM) data and IP packet data. This VoIP switch would interface to the PSTN Signalling network using a Signalling Gateway. The Signalling Gateway provides the translation between SS7 and IP.

In a quasi-associated SS7 signalling network, the Signalling Gateway would connect to the local STP mated pair using A-links. In a fully associated SS7 Signalling network, the signalling gateway would connect directly with the SSPs using F-links. In the fully associated network signalling case, the SS7 signalling link is usually carried over the same facilities as the voice trunks. Since these voice trunks terminate on the media gateway, external circuitry (e.g. channel banks) are required to extract the signalling channel and route it to the signalling gateway. Moreover, since the media and signalling gateways are typically geographically quite dispersed, the equipment associated with transmitted the extracted signalling channel to the signalling gateway is expensive.

Accordingly, it is desired to provide a system which addresses some of these shortcomings.

SUMMARY OF THE INVENTION

This invention distributes the MTP Level 2 functionality between the Signaling Gateway and the Media Gateway. It allows F-links in a fully associated SS7 signaling network to be terminated on the Media Gateway and the SS7 messages to be passed between the Media Gateway and the Signaling Gateway over IP.

According to one aspect of the invention, there is provided a method providing distributed Message Transfer Part (MTP) functionality over an Internet Protocol (IP) network, said method comprising: at a first media gateway: receiving conventional MTP signalling units from a first network element; removing repeated MTP signalling units from said MTP signalling units received; either before or after said removing, encapsulating received MTP signalling units into data packets to form a reduced signalling unit packet stream; transmitting said reduced signalling unit packet stream to a signalling gateway; receiving at said signalling gateway said reduced packet stream at said signalling gateway; transmitting packets encapsulating MTP signalling units to one of said first media gateway and a second media gateway, said transmitted packets being responsive to said received reduced signalling unit packet stream; receiving at said one of said first media gateway and said second media gateway said packets transmitted by said signalling gateway; and at said one of said first media gateway and said second media gateway, re-creating conventional MTP signalling units based on said routed packets and transmitting said re-created conventional MTP signalling units to one of said first network element and a second network element.

According to a further aspect of the invention there is provided a Voice over Internet Protocol (VoIP) switch providing a distributed Message Transfer Part Level 2 (MTPL2) protocol, said VoIP switch comprising: a plurality of media gateways, each of said media gateways in communication with a conventional SS7 physical link, said conventional SS7 physical link in communication with a network element; a signalling gateway; an IP network providing IP communication between said plurality of media gateways and said signalling gateway.

According to a still further aspect of the invention there is provided a media gateway comprising: a receiver for receiving a contiguous stream of signalling units from a network element; a filter for discarding repeated signalling units in said received stream; an encapsulated data transmitter adapted to transmit data encapsulating said signalling units over a packet switched network; an encapsulated data receiver adapted to receive encapsulated data encapsulating signalling units from a packet switched network; a processor adapted to: encapsulate signalling units forming said stream of signalling units either before or after said discarding by said filter; and de-encapsulate signalling units received by said encapsulated data receiver and generate signalling units to re-create a contiguous stream of signalling units; and a signalling unit transmitter transmitting a re-created contiguous stream of signalling units to a network element.

According to a still further aspect of the invention there is provided a signalling gateway comprising: an encapsulated data receiver for receiving encapsulated signalling units from a packet switched network; an encapsulated data transmitter adapted to transmit data encapsulating signalling units over a packet switched network; a processor adapted to: de-encapsulate said received encapsulated signalling units and generate signalling units compliant with the Message Transfer Part Level 2 protocol; transmit said generated signalling units to a Message Transfer Part Level 3 processor; receive conventional signalling units from said Message Transfer Part Level 3 processor; and encapsulate said received conventional signalling units for transmission by said encapsulated data transmitter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood after reference to the following detailed specification read in conjunction with the drawings wherein.

DETAILED DESCRIPTION OF THE PREFERRED EMBODIMENTS

Figure 1:
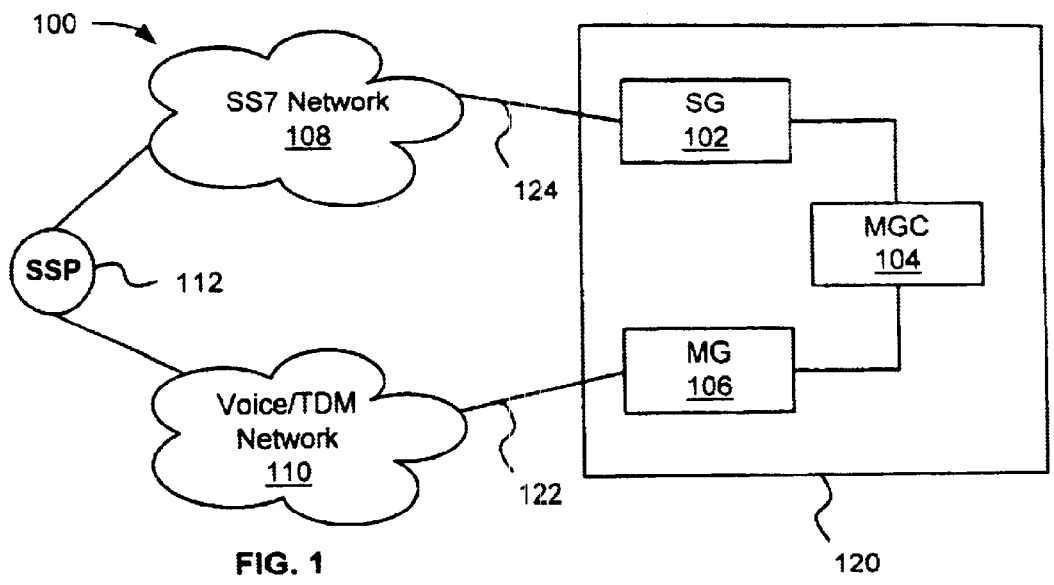
FIG. 1 illustrates a conventional quasi-associated SS7 network in communication with a conventional a VoIP switch.

Referencing FIG. 1, a conventional quasi-associated signaling network 100 having dedicated facilities 124 (e.g. T1 or E1) carrying signaling traffic between SG 102 of VoIP 120 and SS7 Signaling network 108 is illustrated. Separate facilities 122 are used to connect MG 106 with the PSTN voice network 110. MGC 104 controls SG 102 an MG 106. SSP 112 is operatively connected to SS7 Signaling network 108 and PSTN voice network 110.

Figure 2:
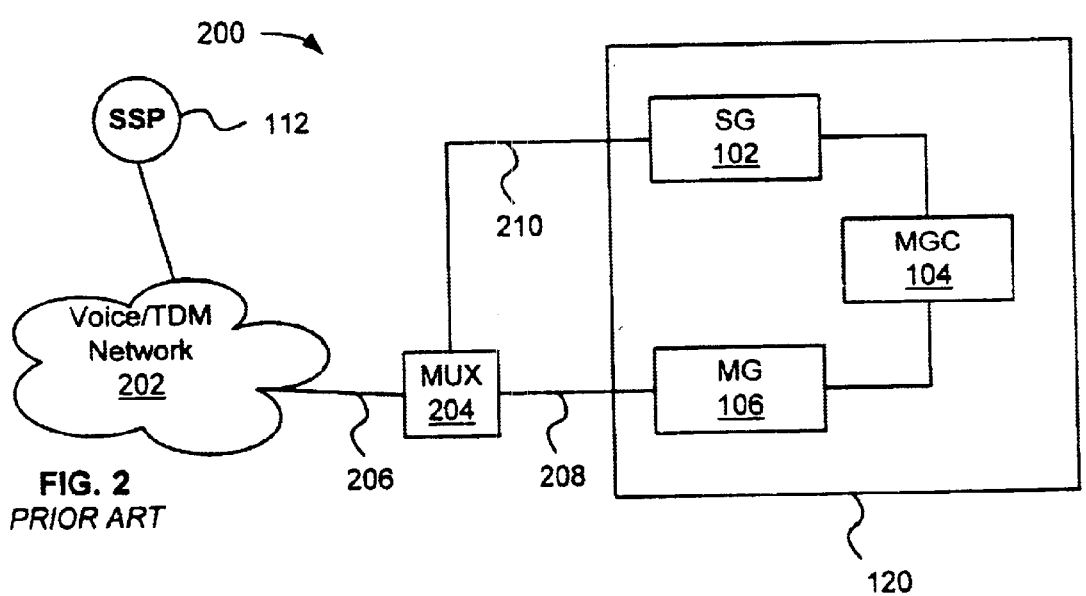
FIG. 2 illustrates a fully associated SS7 network in communication with a conventional VoIP switch.

Referencing FIG. 2, in a fully associated signaling network 200 facilities 206 carry both the signaling channel and the voice trunks from the Voice/TDM Network 202. Since the same facilities 206 carry both voice trunks and signalling channels an external MUX 204 is required to extract the signaling channel from the facility 206 and route it to the SG 102 of VoIP switch 120 over dedicated signaling facilities 210. The voice trunks on facilities 206 are transmitted by MUX 204 to MG 106 of VoIP 120 over dedicated facilities 208.

Figure 3:
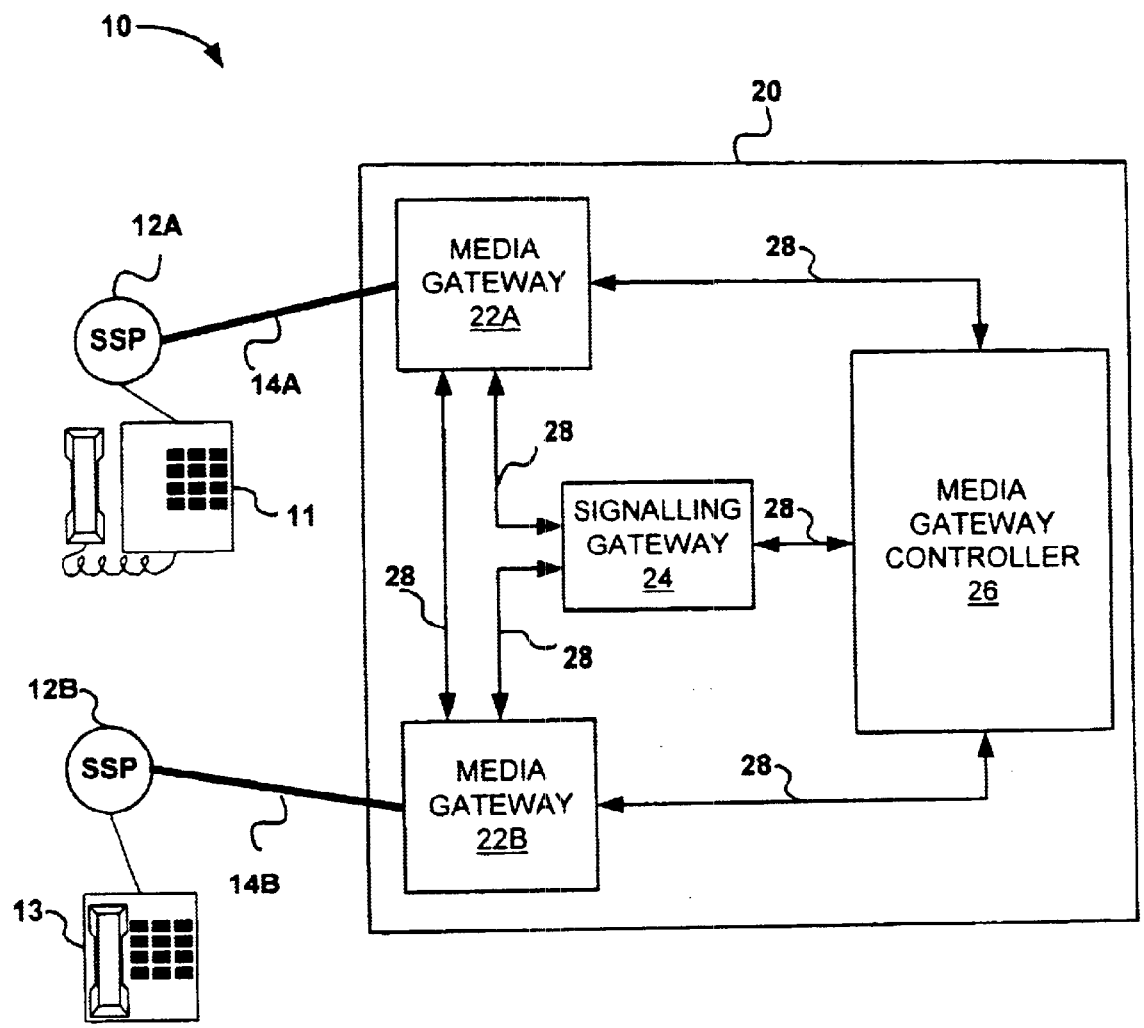
FIG. 3 illustrates a fully associated network in communication with a VoIP switch incorporating an embodiment of the invention.

Generally, FIG. 3 shows a fully associated signaling network comprising SSPs 12 and voice/signaling links 14 in communication with VoIP switch 20 embodying one aspect of the invention. As illustrated, both the voice trunks and signaling channels carried on links 14A, 14B are terminated at MG 22. The signaling channel information is then routed via IP from the MGs 22 to the SG 24. Advantageously external MUXes are no longer required to extract the signaling channel.

Links 14B may be any conventional physical links such as, for example, an E-1, DS-1, DS-3, or other similar links. Although a single link 14 is shown terminating at each Media Gateway (MG) 22, the present invention, an embodiment of which is illustrated in FIG. 3, would likely have a plurality of links terminating at each MG 22 when actually deployed.

In communication with SSP 12A is calling party telecommunications device 11 (hereinafter calling party 11). Similarly, called party telecommunications device 13 (hereinafter called party 13) is in communication with SSP 12B. Calling party 11 and called party 13 may be, for example, a telephone handset, a computer, a wireless voice or data terminal, or the like.

VoIP switch 20 comprises media gateways (MGs) 22A, 22B (collectively MGs 22) in communication with SSPs 12A, 12B via links 14A, 14B, respectively, and each other. Also in communication with MGs 22 is Signalling Gateway (SG) 24 and Media Gateway Controller (MGC) 26 via communications links 28. Communications links 28 represent logical, transient routing paths over an IP network such, as for example, the Internet. Moreover, it should be noted that VoIP switch 20, while represented as a single entity physically located at a single physical site, it may not always be so configured. In fact, MGs 22, SG 24 and MGC 26 are likely to be physically separate but inter-operate to provide similar MTP functionality over an IP network that is conventionally provided by an Intelligent Network (IN) such as, for example, an SS7 network.

Although VoIP switch 20 is illustrated with two MGs 22, a single SG 24 and a single MGC 26, it may be desirable to implement the present invention with a different number of the elements forming VoIP switch 20. For example, a plurality of MGs 22, a plurality of SGs 24 and a plurality of MGCs 26 may be in communication with each other over network 30, all forming VoIP switch 20.

Generally, and in summary, in operation of voice and data network 10, SSP 12A, through a conventional request made by a calling party 11, requires communication with SSP 12B so that communication between calling party 11 and called party 13 can be established. Voice and SS7 signals, in the MTPL2 format corresponding to conventional SS7 signaling units, are transmitted by SSP 12A to MG 22A. The signaling data is extracted by MG 22A and transmitted to SG 24 in IP packets over the network formed by connections 28. The IP packets received by SG 24 are further processed and transmitted to MGC 26 as IP packets over communications links 28. Responsive to the received IP packets, MGC 26 determines the MG 22 associated with the called party 13, which in this example is MG 22B. MGC 26 communicates with MG 22B and SSP 12B via SG 24 and a voice connection from calling party 11 to called party 13 is created via SSP 12A, link 14A, MGs 22A and 22B, link 14 and SSP 12B. via SG 24 and a voice connection from calling party 11 to called party 13 is created via SSP 12A, link 14A, MGs 22A and 22B, link 14 and SSP 12B.

Figure 4:
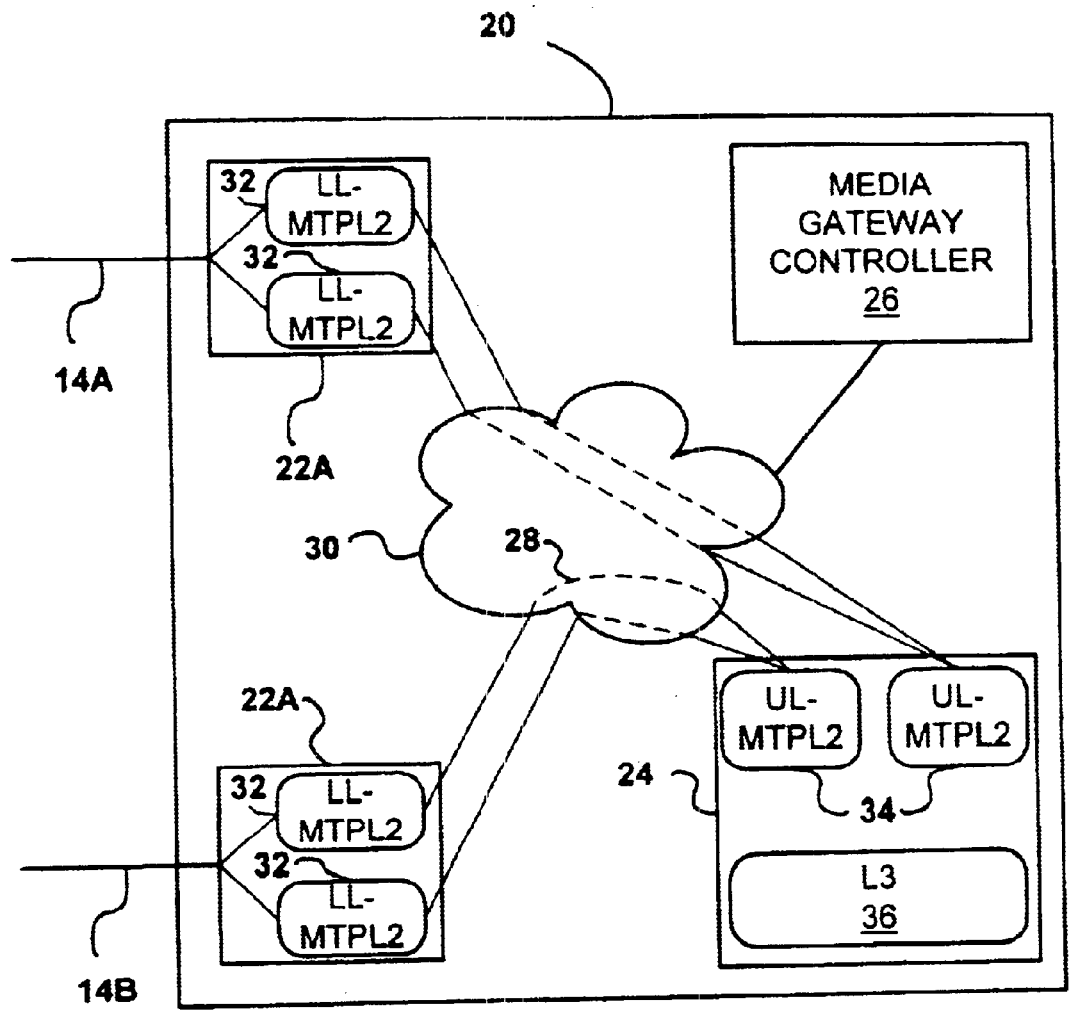
FIG. 4 detailed schematic of an enlarged portion of FIG. 3.

Referencing FIG. 4, a more detailed and functional view of VoIP switch 20 is illustrated. Since there are no fixed connections between the elements of VoIP switch 20 (i.e., network 30 provides connectionless communications between a pair of these elements), each element (i.e. each MG 22, SG 24 and MGC 26) can communicate directly with every other element of VoIP switch 20.

Further, and as described in greater detail below, MGs 22 and SG 24 interact to provide MTPL2 functionality that is distributed between these two components of VoIP switch 20. That is, when viewed from the perspective of a network element, such as, for example, an SSP 12, signalling units (SUs) complying with the conventional MTPL2 standard are transmitted to and received from VoIP switch 20 at the MGs 22.

Figure 5:
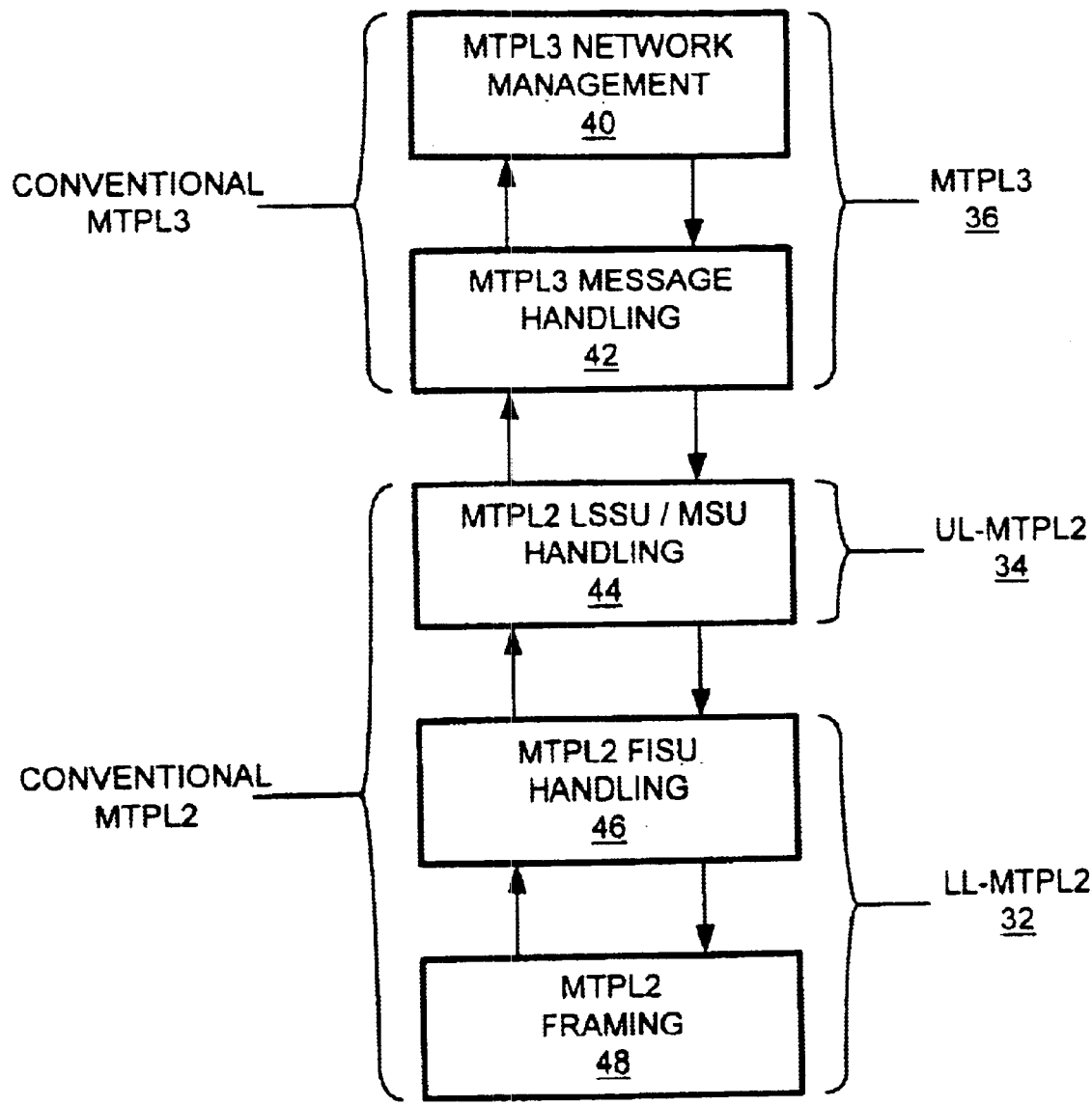
FIG. 5 is a schematic illustrating the distribution of a conventional MTP stack between portions of FIG. 4.

Referencing FIG. 5, conventional MTPL3 comprises MTPL3 network management functions 40 and MTPL3 message handling functions 42. Conventional MTPL2 comprises MTPL2 LSSU and MSU handling functions 44, MTPL2 FISU handling functions 46 and MTPL2 framing 48. In contrast, the distributed MTPL2 protocol described herein maintains MTPL3 functions which are performed by MTPL3 functional block 36. However, the MTPL2 functions are distributed between LL-MTPL2 functional block 32 (which performs MTPL2 framing and MTPL2 FISU handling functions 48 and 46, respectively) and UL-MTPL2 block 34 which performs MTPL2 LSSU and MSU handling functions 44.

As indicated above, both MGs 22 and SG 24 provide a portion of the MTPL2 functionality. Specifically, MGs 22 incorporate Lower Level MTPL2 (LL-MTPL2) functional block 32 while SG 24 includes Upper Level MTPL2 (UL-MTPL2) functional block 34. As described above, MGs 22 and SG 24 communicate via communications links 28 over IP network 30. Network 30 is, for example, the internet, an intranet, or other IP network. SG 24 also includes MTPL3 functional block 36 which is in communication with UL-MTPL2 block 34 and is described in greater detail below.

In operation, and in overview, VoIP switch 20 will receive at MG 22A, for example, conventional MTPL2 compliant SUs over link 14A. As is known in the art in a conventional MTPL2 environment, a data link, such as link 14A transmits a continuous stream of MTPL2 compliant data in both directions. This continuous stream of data will include Message Signalling Units (MSUs), Link Status Signalling Units (LSSUs) and Fill-In Signalling Units (FISUs). Typically, the continuous data stream will include repetitive and identical LSSUs and FISUs. Moreover, packetizing (i.e., encapsulating the SUs into IP compliant data packets), transmitting all of these IP data packets over an IP network, and de-encapsulating (i.e., stripping off the IP encapsulation) would require a prohibitive amount of overhead. The present invention, an embodiment illustrated in FIG. 4, receives at a VoIP switch and transmits from the VoIP switch conventional MTPL2 compliant SUs in conventional numbers (i.e., a continuous data stream corresponding to MSUs, LSSUs and FISUs are transmitted and received on links 14). However, internally VoIP switch 20 MGs 22 filters extraneous and duplicate FISUs and LSSUs. Accordingly, the number of packets that must be transmitted over IP network is significantly reduced. From the view of a conventional MTPL2 compliant network element such as SSPs 12, VoIP switch 20 appears as simply another MTPL2 network element.

Figure 6A:
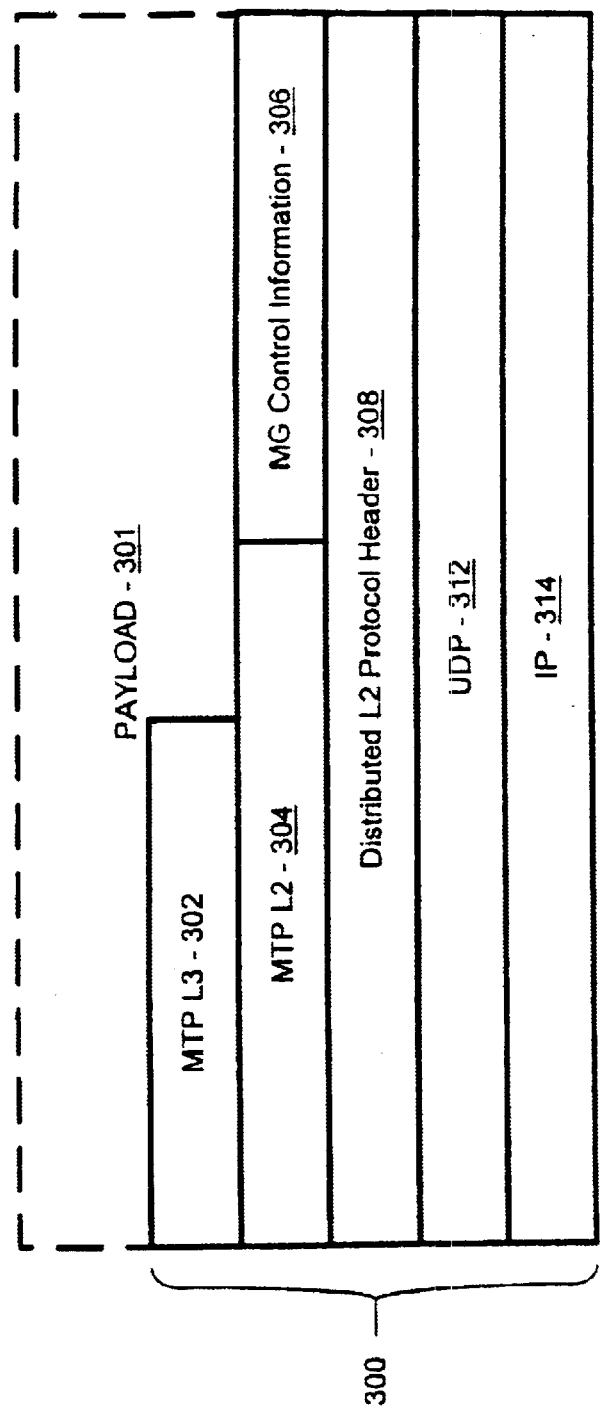
FIG. 6A is a schematic of a protocol stack embodying one aspect of the invention.
Figure 6B:
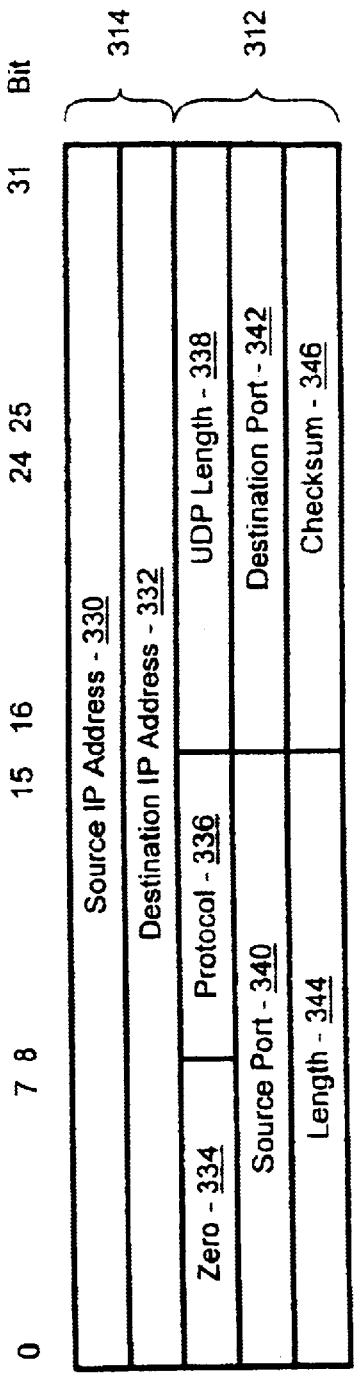
FIG. 6B is a detailed schematic of a first portion of FIG. 6A.
Figure 6C:
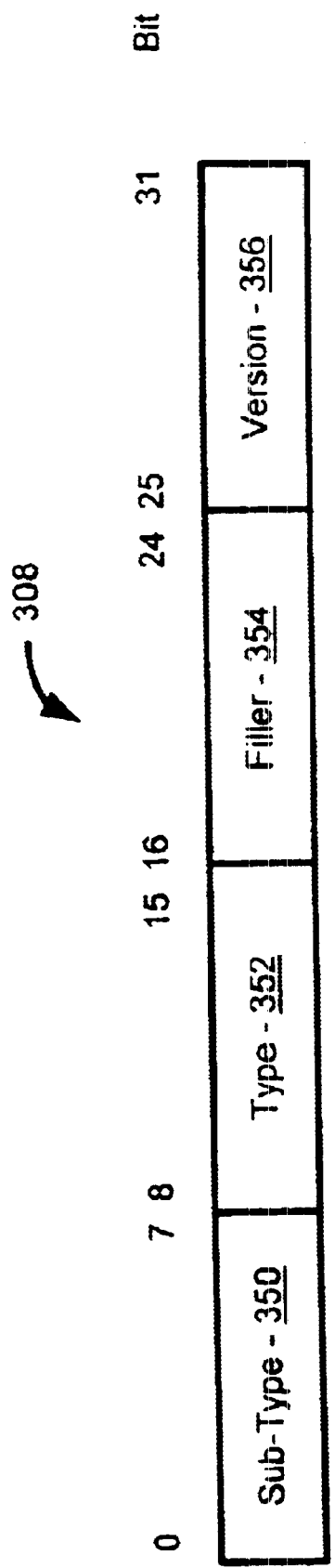
FIG. 6C is a detailed schematic of a second portion of FIG. 6A.

FIGS. 6A, 6B and 6C illustrate the data structures—which incorporate conventional Internet Protocol (IP) data structures—used to transmit data conforming to the distributed MTPL2 protocol embodying one aspect of this invention. The distributed MTPL2 protocol is used for communication between the SG 24 and MGs 22 (FIGS. 4 and 7) and, specifically, between the UL-MTPL2 34 and LL-MTPL2 32 components. Referencing FIG. 6A, Distributed Protocol Stack (DPS) 300 is comprised of an IP layer 314, a User Datagram Protocol (UDP) layer 312, Distributed L2 Protocol (DL2P) Header layer 308, MG Control Information layer 306, MTPL2 protocol layer 304 and MTPL3 protocol layer 302. Appended to DPS 300 is payload data 301 which represents the SS7 signal payload (e.g., ISUP). IP layer 314 and UDP layer 312 are illustrated in greater detail in FIG. 6B and described and discussed below. DL2P header 308, which is described below and illustrated in greater detail in FIG. 6C, is positioned directly above the UDP header 312 of the DPS 300. MG Control Information header layer 306 contains control information used to control the resources of the MGs 22 from SG 24. For example, SG 24 can request that BERT (Bit Error Rate Testing be performed on the SS7 links by sending a message containing the appropriate information in the MG Control Information header 306. Finally, MTPL2 304 conforms to the SS7 standards (i.e. ANSI T1.111.3 or ITU-T Q.703, the contents of which are hereby incorporated herein). That is, the MTPL2 header 304 contains the data necessary to form the three standard signalling units under the conventional MTPL2 protocol, namely the Fill-In Signal Units (FISUs), Link Status Signal Units (LSSUs) and the Message Signal Units (MSUs). Conventionally, data corresponding to FISUs is transmitted continuously on a signalling link in both directions between the two network elements unless other signalling units (i.e., LSSUs or MSUs) are present. FISUs carry basic level two information (e.g., acknowledgement of signalling unit receipt by a remote network element). Because a CRC checksum is calculated for each FISU, signalling link quality between the two network elements is checked continuously by both network elements at either end of the link. LSSUs carry one or two octets (8-bit bytes) of link status information between network elements at either end of a signalling link. The link status is used to control link alignment and to indicate the status of a network element (e.g., local processor outage) to another network element. MSUs carry all call control, database query, database response, network management and network maintenance data.

Continuing with the description of FIG. 6A, MTPL2 header 304 is populated with conventional data known to those skilled in the art. This data in part, used in sequencing of received SUs. Similarly, MTPL3 header 302 contains the header information for MTPL3 which is conventionally stored in each MSUs' Signaling Information Field (SIF).

Referring to FIG. 6B, the IP header 312 and UDP header 314 are illustrated in greater detail. Other fields found in a conventional IP header are not illustrated but may also be used. The Source IP Address 330 and Destination IP Address 332 are standard 32-bit addresses.

UDP header 312, which conforms to RFC 768, the contents of which are hereby incorporated herein, comprises an eight bit Zero field 334; an eight bit Protocol field 336; an eight bit UDP length field 338, identifying the length of the UDP datagram; a sixteen bit Source Port field 340, identifying the port in the source host (associated with IP address 330) to which a reply may be sent; a sixteen bit Destination port field 342, identifying the point of termination in destination host; a sixteen bit Length field 344, indicating the total length of the IP packet, and a sixteen bit Checksum field 346, for performing an error check on the IP header 314 and UDP header 312, and the remaining portions of DPS 300 and payload data 301. Accordingly, a checksum field in the remaining portions of DPS 300 may be unnecessary in some applications since Checksum 346 is calculated for the entire packet.

Generally, there will be a single UDP port on the SG 24 for each SS7 link 14 serviced by the SG 24. To correlate messages received on a specific UDP port, a mapping operation will be performed based on the source IP address 330 and the source port 340 stored within the IP header 314 and UDP header 312, respectively. Messages with an unknown source IP address 330 or unknown source port 340 will be discarded by SG 24.

Accordingly, for each MG 22 serviced by SG 24, SG 24 provides service for each signalling link terminating on a serviced MG 22. To accomplish this a mapping or routing table is generated and stored at SG 24 which identifies the: IP address for each MG 22 serviced by the SG 24; and the UDP source ports associated with each link 14 terminating on a serviced MG 22. A similar mapping or routing table will be generated and stored at each MG 22. The MG routing table will include the UDP port associated with each link 14 terminating at MG 22, the IP address of any SG 24 which services the MG 22 and the UDP port associated with the IP address of the SG 24 associated with the MG 22.

Based on the foregoing, it should be apparent that whenever an IP message is transmitted on VoIP switch 20 (FIG. 3) the UDP and HP headers 312 and 314, respectively, will be populated with the IP addresses and UDP ports retrieved from the routing table stored at the transmitting element (e.g., MG 22, SG 24, MGC 26).

Referring to FIG. 6C, the thirty-two bit DL2P Header 308 four eight bit fields, namely the version field 356, the filler field 354, the type field 352 and the sub-type field 350.

The Version field 356 identifies the release version of the Distributed MTPL2 protocol that is being used. If a message identifies a version of the distributed MTPL2 architecture that is unknown to the receiving node (such as the MGs 22 or the SG 24), the receiving node will respond with a signal indicating a supporting version of the distributed MTPL2 architecture. This signal will inform the sender of the message using an unknown version of the Distributed MTPL2 protocol that a message with an unsupported version has been received. Moreover, the signal message indicates to the receiver of this message (i.e., the sender of the message of unknown protocol version) the version of the protocol supported by the sender of the signal message.

Filler field 354 is set to zero and is used to ensure that DL2P Header 308 is long word aligned (i.e., DL2P header 308 is a multiple of thirty-two bits).

While specific data structures, including number of fields, bit lengths for those fields, and general organization embodying one aspect of the invention are illustrated in FIGS. 6A, 6B and 6C, a person skilled in the art will appreciate that other data structures including a differing number of fields of various bit lengths, different bit lengths of the fields disclosed, and other organizations can be used to implement the invention disclosed herein.

With reference to the foregoing acronym definitions, the components of VoIP switch 20 (FIG. 3) will support the values in Type field 352 of DL2P Header 308 identified in Table 1.

TABLE 1

Type Field 352 Entries for MGs 22, SG 24 and MGC 26

| Value | Description |
|-------|-------------|
| 01 | TXC-MG |
| 02 | RC-MG |
| 03 | AERM |
| 04 | SUERM |
| 05 | BERT |
| 06 | OM-MG |

MGs 22 and SG 24 will populate sub-type field 350 of DL2P Header 308 with one of many possible values corresponding to a value in Type field 352. Table 2 lists the values that can be entered into Sub-type field 350 by the components of VoIP switch 20 and the message represented by those values.

TABLE 2

Sub-Type Field 350 Entries of VoIP Switch 20

| Type | Sub-Type | Message |
|---|---|---|
| TXC-MG | 01 | START-TXC |
| | 02 | ACK-START-TXC |
| | 03 | STOP-TXG |
| | 04 | ACK-STOP-TXC |
| | 05 | INH-MSU |
| | 06 | ACK-INH-MSU |
| | 07 | UNI-MSU |
| | 08 | ACK-UNI-MSU |
| | 09 | MSU (no acks) |
| | 11 | FISU |
| | 12 | ACK-FISU |
| | 13 | SEND-LSSU |
| | 14 | ACK-SEND-LSSU |
| RC-MG | 01 | START-RC |
| | 02 | ACK-START-RC |
| | 03 | STOP-RC |
| | 04 | ACK-STOP-RC |
| | 05 | FISU |
| | 06 | ACK-FISU |
| | 07 | LSSU |
| | 08 | ACK-LSSU |
| | 09 | MSU (no acks) |
| AERM | 01 | START-AM |
| | 02 | ACK-START-AM |
| | 03 | STOP-AM |
| | 04 | ACK-STOP-AM |
| | 05 | EMERGENCY |
| | 06 | ACK-EMERGENCY |
| | 07 | NORMAL |
| | 08 | ACK-NORMAL |
| | 09 | ABORT |
| | 10 | ACK-ABORT |
| | 11 | CORRECT-SU |
| | 12 | ACK-CORRECT-SU |
| SUERM | 01 | START-EM |
| | 02 | ACK-START-EM |
| | 03 | STOP-EM |
| | 04 | ACK-STOP-EM |
| | 05 | LINK-FAIL |
| | 06 | ACK-LINK-FAIL |
| BERT | 01 | START-BERT |
| | 02 | ACK-START-BERT |
| | 03 | STOP-BERT |
| | 04 | ACK-STOP-BERT |
| | 05 | STATUS-BERT |
| | 06 | ACK-STATUS-BERT |
| | 07 | LOCAL-LOOP |
| | 08 | ACK-LOCAL-LOOP |
| | 09 | REM-LOOP |
| | 10 | ACK-REM-LOOP |
| OM-MG | 01 | OM-START |
| | 02 | ACK-OM-START |
| | 03 | OM-DATA |
| | 04 | ACK-OM-DATA |

Addition information may be required for some DL2P messages. This information would be passed in the MG Control information field 306. Table 3 identifies the extra information that may be used in the DL2P messages.

TABLE 3

Type Field 352 and Sub-Type Field 350 Entries for MGC 22

| Type | Sub-Type | Message | Additional Entries |
|---|---|---|---|
| TXC-MG | 13 | SEND-LSSU | Octet indicating which LSSU to send:<br>00 - Status Indicator Out of Alignment (SIO)<br>01 - Status Indicator Normal (SIN)<br>02 - Status Indicator Emergency (SIE)<br>03 - Status Indicator Out of Service (SIOS)<br>04 - Status Indicator Processor Outage (SIPO)<br>05 - Status Indicator Busy (SIB) |
| | 14 | ACK-SEND-LSSU | Also contains octet indicating which LSSU command is acknowledged. |
| BERT | 01 | START-BERT | Octet indicating which BERT pattern to send:<br>00 - 511 bit pattern<br>01 - 2047 bit pattern<br>02 - Repeated pattern of 100 octets of FFh followed by 100 octets of 00h.<br>03 - Repeated patterns of 100 octets of 7Eh followed by 100 octets of 00h.<br>04 - Continuous 32h<br>05 - Continuous 40h<br>Only pattern 00 will be used. |
| | 02 | ACK-START-BERT | Returns octet specifying pattern actually being sent. |
| | 04 | ACK-STOP-BERT | Returns status of BERT test, which includes:<br>Octet<br>1–4 Bits Sent<br>5–8 Bits in error |
| | 05 | STATUS-BERT | Returns same information as ACK-STOP-BERT message. |
| OM-MG | 03 | OM-DATA | Returns the OMs kept on the MG.<br>Octet<br>1–2 = Number of SU errors (SUERM). |

Figure 7:
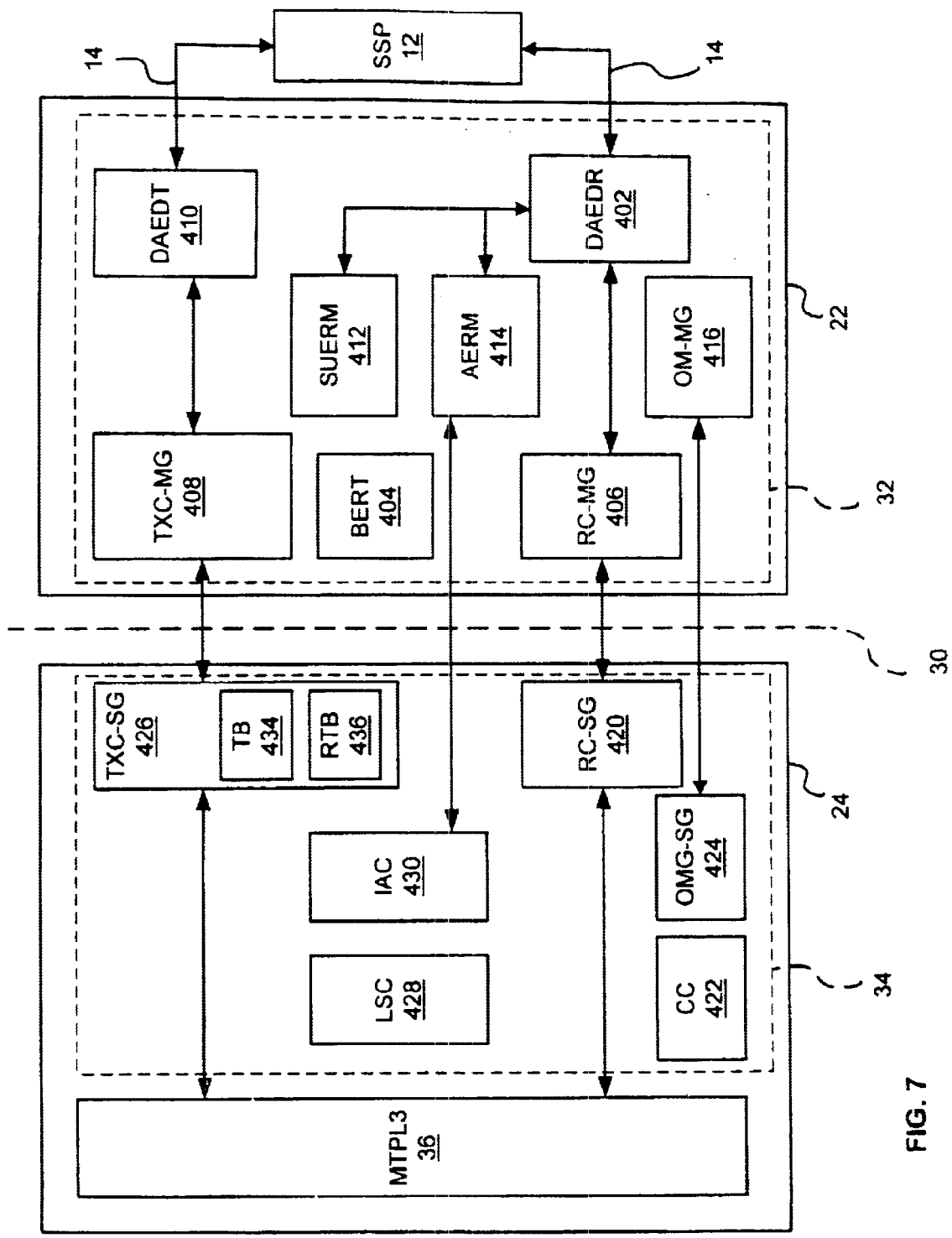
FIG. 7 is a detailed schematic of a portion of FIG. 4.
Figure 8:
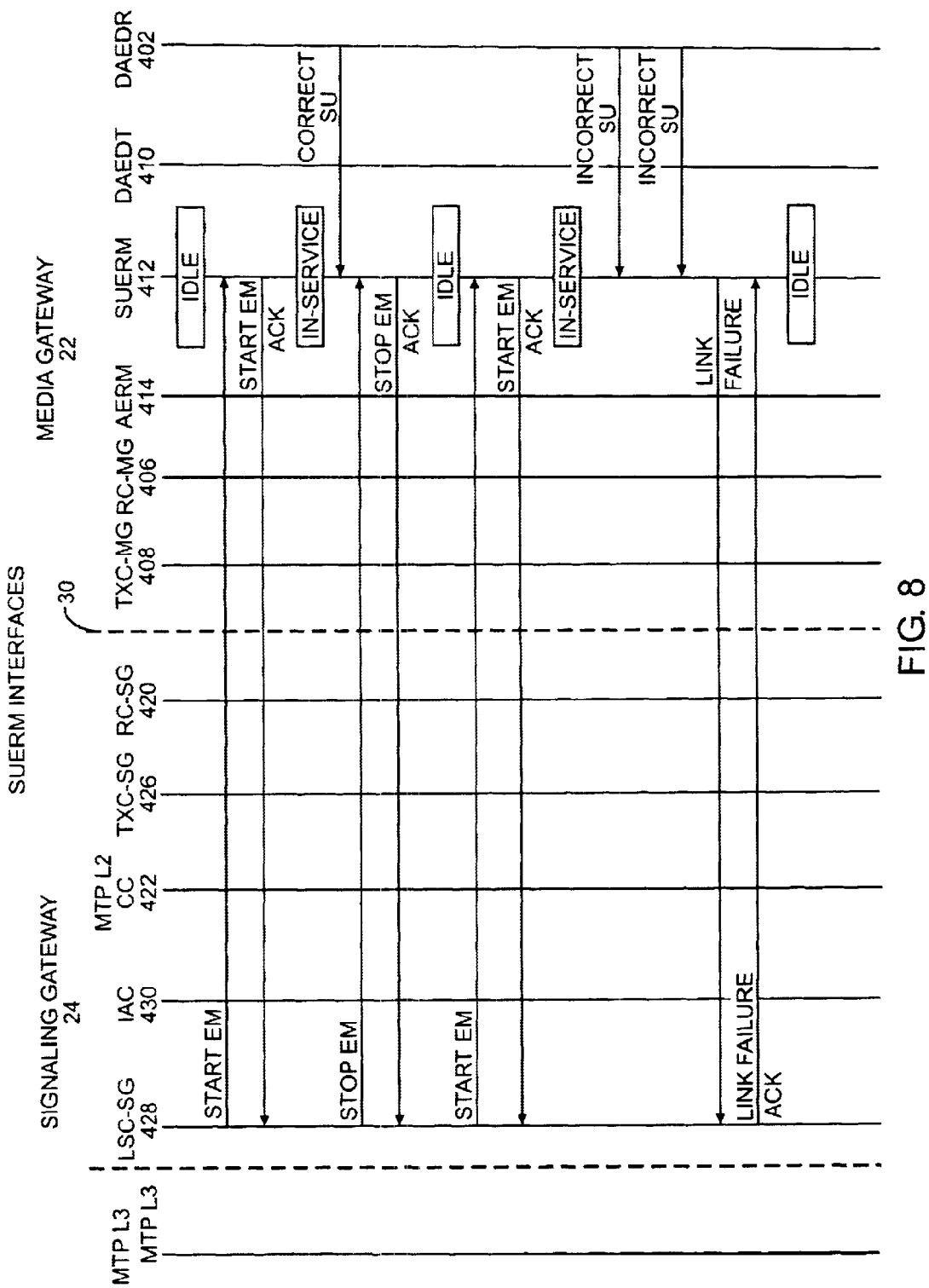
FIG. 8 is a first signal flow diagram of the operation of the SS7 network portion of FIG. 4.
Figure 9:
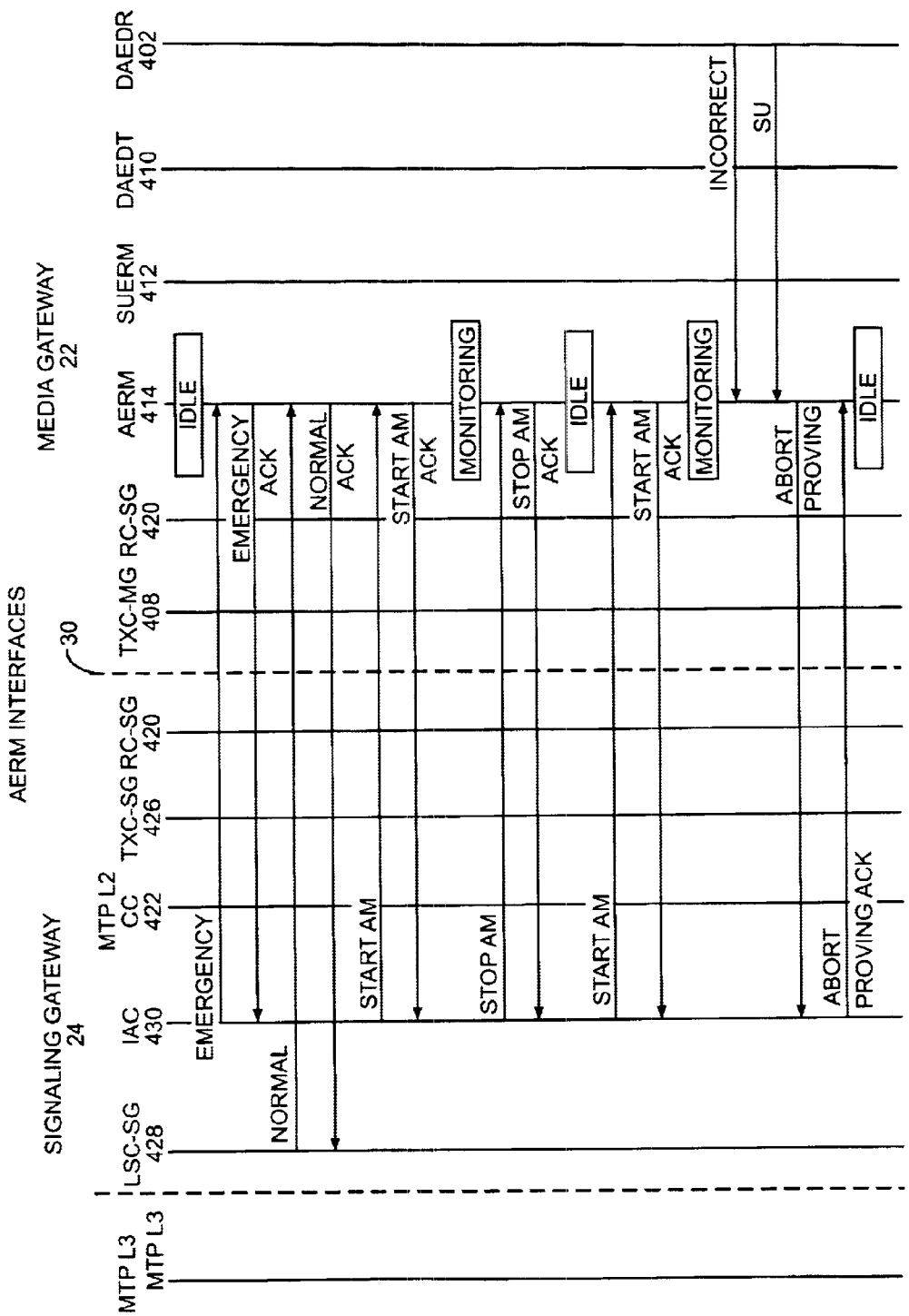
FIG. 9 is a second signal flow diagram of the operation of the SS7 network portion of FIG. 4.

FIG. 7 shows the split in MTP Level 2 functionality between the SG 24 and the MG 22. The UL-MTPL2 block 34 (Upper Layer of MTP Level 2) resides on SG 24, while the LL-MTPL2 block 32 (Lower Layer of MTP Level 2) resides on MG 22. Examples of the signal flows between LL-MTPL2 and UL-MTPL2 functional blocks 32 and 34 are illustrated in FIGS. 8 and 9. Signals transmitted between LL-MTPL2 functional block 32, which forms part of MG 22, and UL-MTPL2 functional block 34, forming part of SG 24, are transmitted across network 30, which is illustrated as a dotted line boundary between UL-MTPL2 block 34 and LL-MTPL2 block 32 in FIGS. 7, 8 and 9.

MG 22 comprises LL-MTPL2 functional block 32 which operates to perform: the reception of conventional data signals on data links 14; the transmission of data complying with the distributed MTPL2 architecture described herein to UL-MTPL2 functional block 34 of SG 24; the reception of data from SG 24; and the transmission of conventional data on links 14. LL-MTPL2 functional block 32 comprises: Delimitation, Alignment, Error Detection Receive (DAEDR) block 402; Receive Control located at Media Gateway (RC-MG) block 406; Transmit Control located at Media Gateway (TXC-MG) block 408; and Delimitation, Alignment, Error Detection Transmit (DAEDT) block 410. Also forming part of LL-MTPL2 functional block 32 are Bit Error Rate Testing (BERT) block 404, Signalling Unit Error Rate Monitor (SUERM) block 412, Alignment Error Rate Monitor (AERM) block 414, and Operational Measurement at the MG (OM-MG) block 416.

SG 24 comprises UL-MTPL2 functional block 34 which operates to perform: the reception of MTPL3 data from MTPL3 36; the transmission of data complying to with the distributed MTPL2 architecture to LL-MTPL2 functional block 32 of MG 22; the reception of data from MG 22; and the transmission of MTPL3 data to MTPL3 36. UL-MTPL2 functional block 34 comprises: Reception Control at the SG (RC-SG) block 420 and Transmission Control at the SG (TCX-SG) block 426. TCX-SG block 426 comprises Transmission Buffer (TB) block 434 and Re-Transmission Buffer (RTB) block 436. TCX-SG 426 transmits sequenced data packets and stores a copy in RTB 436. If one or more of the transmitted packets are not received, the missing packets are retrieved from RTB 436 an retransmitted. Otherwise, the copies of received packets are deleted from RTB 436. UL-MTPL2 functional block 34 further comprises Congestion Control (CC) block 422; Operational Measurements at the SG (OM-SG) block 424; Link State Control (LSC) block 428; and Initial Alignment Control (IAC) block 430.

Generally and in overview, DAEDR block 402 receives conventional MTPL2 data from link 14. The data is processed (i.e., delimited and error detection is performed) and transferred to RC-MG block 406 which filters the received data to remove repeated LSSUs and FISUs. The filtered data is then transmitted to RC-SG 420 of SG 24. RC-SG 420 performs management of the sequence numbers of the received data based on the information stored in MTPL2 header 304. The data received by SG 24 is processed and MSUs are transmitted to MTPL3 36 while FISUs and LSSUs are processed by the RC-SG block 420. Transmitted MTPL3 data is transferred to TCX-SG block 426 where, as described above, sequence number management is performed. The TCX-SG block 426 transmits, over IP network 30 (FIG. 7), the MTPL3 data to the TXC-MG block 408 where repetitive tasks (e.g., generation of repetitive LSSUs and FISUs) are performed. Data received and generated by TXC-MG block 408 is transmitted to DAEDT block, processed (i.e., delimited, aligned—into conventional SS7 signals) and then transmitted by MG 22 over link 14 to an SS7 network element such as, for example, an SSP 12.

Also in overview, SUERM block 412, AERM block 414 and OM-MG block 416 also form part of MG 22. Generally, the SUERM and AERM blocks, 412 and 414, respectively, communicate with DAEDR block 402 and monitor the number of signalling unit (SU) errors detected by the DAEDR block 402. The OM-MG block 416 records operational measurements (OMs) of LL-MTPL2 functional block 32. These OMs are transmitted, when requested, to SG 24. The OMs are cleared from OM-MG 416 when uploaded to SG 24.

Also forming part of SG 24 are CC block 422, OM-SG block 424, LSC block 428 and IAC block 430. CC Block 422 operates to control congestion on SG 24 by monitoring the MTPL2 receive buffer. OM-SG block 424 records a number of operational measurements of UL-MTPL2 functional block 34. The OM-SG block 424 is also in communication with OM-MG block 416 of MG 22, and may send a request to the OM-MG block 416 to transmit its OMs records to the OM-SG block 424. OM-SG block 424 will then store the OM data uploading to OM-SG 424 in response to this request. LSC block 428 provides general management of the MTPL2 link 14. IAC block 430, which is in communication with AERM block 414 of MG 22, performs initial alignment of links 14, monitors LSSUs received from link 14 and communicates with AERM block 414 of MG 22 to determine the quality of the link 14 during the proving period.

Each of the functional blocks that form UL-MTPL2 functional block 34 and LL-MTPL2 functional block 32, and their interactions, are described in detail below. It should be noted that many aspects of LL-MTPL2 32, UL-MTPL2 34 and MTPL3 36 operate in accordance with ANSI T1.111.4 or BellCore GR-246, the contents of both of which are hereby incorporated herein.

DAEDR functional block 402 receives a data stream from voice/signaling link 14 and extracts the signaling data therefrom. DAEDR 402 then, as is conventional, performs delimitation, alignment, error detection on the received signalling data forming conventional MTPL2 signalling units.

The RC-MG block 406, in co-operation with RC-SG block 420 of SG 24, provides signal reception control. RC-MG block 404 is tasked with performing repetitive functions in order to reduce IP traffic between MG 22 and SG 24. As is known in the art, FISUs are conventionally transmitted, in both directions, continuously over a signaling link, such as links 14, unless LSSUs or MSUs are present. This process would, if performed over an IP network, such as network 30 (FIG. 4), waste network resources. Accordingly, RC-MG 406 performs operations to reduce IP traffic between MG 22 and SG 24 while simultaneously providing the benefits of the MTP protocol.

RC-MG block 406 transitions from IDLE to IN-SERVICE upon receipt of a START-RC message from RC-SG block 420 of SG 24. Upon receipt of the START-RC message (Type: 01, Sub-Type: 02 are entered in fields 352 and 350, respectively, of DL2P Header 308—FIG. 6C), RC-MG 406 will transmit an acknowledgement signal (ACK-START-RC) to RC-SG block 406 of SG 24. As indicated previously, messages transmitted between LL-MTPL2 functional block 32 of MG 22 and UL-MTPL2 functional block 34 of SG 24 are transmitted over network 30. RC-MG block 406 transitions from IN-SERVICE to IDLE upon receipt of a STOP-RC message from RC-SG block 420. A STOP-RC message received by RC-MG block 406 is acknowledged by the transmission of an ACK-STOP-RC message from RC-MG 406 to RC-SG 420.

While in IN-SERVICE mode RC-MG 406 will, upon receipt of an FISU, LSSU or MSU from DAEDR block 402, transmit a corresponding FISU, LSSU or MSU message complying with the distributed standard described herein (i.e. sub-type field 350—FIG. 6C—having the value of 05, 07 or 09), to RC-SG block 420. RC-MG 406 will receive, in response to an FISU or LSSU message, an ACK-FISU or ACK-LSSU, respectively, from RC-SG block 420. To reduce IP traffic between RC-MG 406 and RC-SG 420, RC-MG 406 will filter out duplicate FISUs and LSSUs received from DAEDR 402. This filtering involves transmitting only one FISU (or LSSU) in a continuous stream of FISUs (or LSSUs) in a pre-determined period (i.e. only one FISU—or LSSU—every $T_{sanity}$ period). Further, RC-MG 406 will not receive an acknowledgement of MSUs transmitted to RC-SG 420 thereby further reducing traffic on IP network 30. A summary of the substantive message (i.e., non-ACK style messages) are summarised in Table 4 shown below.

TABLE 4

RC-MG Block 406 Message Table

| Message | MSG ID | Signal Source | Signal Destination | Comments |
|---------|--------|---------------|--------------------|----------|
| Start RC | START-RC | RC-SG | — | RC-SG 420 sends this signal when start issued by LSC 428. |
| Stop RC | STOP-RC | RC-SG | — | Stops RC-MG 406. |
| FISU | FISU | — | RC-SG | FISUs received from MTPL3 block 36 transmitted to RC-MG 406 by RC-SG 420 (these FISUs have been filtered by MG 22, but are repeated every $T_{sanity}$ - i.e., only one FISU in a stream of identical FISUs is transmitted every $T_{sanity}$ seconds). |
| LSSU | LSSU | — | RC-SG | LSSUs received from MTPL3 block 36 transmitted to RC-MG 406 by RC-SG 420 (these have also filtered by MG 22 but are repeated every $T_{sanity}$). |
| MSU | MSU | — | RC-SG | MSUs received from MTPL3 block 36 transmitted to RC-MG 406 by RC-SG 420. |

RC-MG block 406 transmits to and receives IP messages from RC-SG block 420 of SG 24. These IP messages transmitted between RC-SG 420 and RC-MG 406 are transmitted over network 30. RC-SG 420 sends IP packets to RC-MG 406 that initiate and cease operation of RC-MG 402. Accordingly, RC-MG 406 operates under partial control of RC-SG 420. In response to the control messages (sent by RC-SG 420) received by RC-MG 406, RC-MG 406 transmits IP packets incorporating an acknowledgement portion in the sub-type field 350 (FIG. 6C). Other IP packets sent by RC-MG 420 to RC-SG 420 include FISU, LSSU and MSU messages. In response to the FISUs and LSSUs (only) transmitted by RC-MG 402, RC-SG 420 sends acknowledgement messages upon receipt of these messages.

As described briefly above LSC block 428 provides some of the control of SG 24 and MG 22. Generally, LSC 428 interfaces with MTPL3 block 36 and controls the distributed MTPL2 functions of MG 22 and SG 24. LSC 428 issues messages to RC-SG 420 to start and stop the receipt and transmission of IP packets between SG 24 and MG 22. As a result of the messages issued by LSC 428, RC-SG 420 transmits the start and stop messages to RC-MG 406 described above. Generally, LSC 428 has the following states: POWER OFF, OUT OF SERVICE, INITIAL ALIGNMENT, ALIGNED/READY, ALIGNED/NOT READY, IN SERVICE and PROCESSOR OUTAGE. These state conditions are transmitted to MTPL3 block 36 (FIG. 4) in accordance with the MTPL3 protocol.

IAC block 430 also provides some of the operational control of SG 24. IAC 420 performs initial alignment between SG 24 and a link 14, when an alignment request is received from a link 14. In addition to providing alignment functions, IAC 430 interacts with AERM block 414 of MG 22 to verify the quality of data received by MG 22 over link 14 during a proving or testing period. Generally, IAC 430 has four states: IDLE, NOT ALIGNED, ALIGNED and PROVING. IAC 430 will transmit IP packets (via the transmission facilities provided by TXC-SG 426) to AERM block 414 to start and stop error monitoring and to indicate an emergency status. IAC 430 will receive from AERM 414 messages indicating that the signaling units received during the monitoring phase are acceptable (CORRECT SU) or that the link should be aborted (ABORT). Table 6 includes of a summary of the messages transmitted between IAC 430 and AERM 414.

TXC-SG 426, which includes transmission (TB) and re-transmission (RTB) buffers 434, 436, respectively, provides general transmission facilities to SG 24. These two buffers operate to manage the forward and backward sequence numbers in a manner known by those skilled in the art.

Messages transmitted to an MG 22 from TXC-SG 426 of SG 24, via network 30 (FIG. 4), are received by the TXC-MG block 408 of a receiving MG 22. TXC-MG 408 has two states IDLE and IN-SERVICE. The transition from IDLE to TN-SERVICE is initiated by the receipt of a START TXC message transmitted by TXC-SG 426 and received by TXC-MG 408. Upon receipt of a START TXC message, TXC-MG 408 will request DEADT block 410 to commence operation. The reverse transition, from IN-SERVICE to IDLE, results from the transmission of a STOP TXC message transmitted from TXC-SG 426 to TXC-MG 408. Generally, TXC-MG 408 and TXC-SG 426 interact to minimize the number of messages that are transmitted over network 30. The quantity of SS7 messages (in IP packets) that need to be transmitted over network 30 are lower than the quantity of conventional SS7 signals that are ultimately transmitted over link 14 by MG 24. For example, TXC-MG 408 will only receive a single message (FISU—see Table 5), transmitted over network 30, that indicates that FISUs are to be generated and transmitted to a desired network element, such as, for example, SS7 12A. Upon receipt of this message, MG 22 will commence generation and transmission of a stream of identical of FISUs to SSP 12A until indicated otherwise.

TXC-SG 426 also transmits to TXC-MG 408 an INH-MSU message which informs TXC-MG 408 to only send FISUs (that is inhibit the transmission of LSSUs and MSUs). A UNI-MSU (Uninhibit MSU) message received by TXC-MG 408 indicates that MSU and LSSU transmission can re-commence. An MSU message received by TXC-MG 408 indicates that an MSU is being transmitted to TXC-MG 408 and is stored in payload 301 (FIG. 6A). A FISU message transmitted to TXC-MG 408 indicates that FISUs are to generated and transmitted from TXC-MG 408 and, eventually, to link 14 (after operations are performed by DAEDT 410) until a message indicating otherwise is transmitted from TXC-SG 426 and received by TXC-MG 408. The FISU message is generally used to check for quality of the transmission media between the two signaling points (in this case, MG 22 and SG 24. An LSSU message received from TXC-SG 426 will indicate that an LSSU message is to be generated with the status field of the standard LSSU set to one of: SIB (which indicates that SG 24 is busy); SIOS (out of service indicator); SIPO (processor outage); SIO (out of alignment indicator); SIE (emergency indicator); and SIN (system normal indicator). A summary of the messages, the source or destination of the message, (i.e., an entry in the Signal Source column indicates that the block entered in the cell is the transmitter of the associated signal message to TXC-MG Block 408 while an entry in the Signal Destination column indicates that TXC-MG block 408 is transmitting the associated signal message to the block entered in the Signal Destination cell) and an associated comment for each message is found in Table 5.

TABLE 5

TXC-MG Block 408 Message Table

| Messages | MSG ID | Signal Source | Signal Destination | Comments |
|---|---|---|---|---|
| Start TXC | START-TXC | TXC-SG | — | TXC-SG sends this signal when start issued by LSC. TXC-MG will inform DAEDT to also start. |
| Stop TXC | STOP-TXC | TXC-SG | — | Stop TXC-MG. |
| Inhibit MSU Transmission | INH-MSU | TXC-SG | — | Indicates that the TXC-MG should send FISU and cancel LSSU and MSU transmission. |
| Uninhibit MSU Indication | UM-MSU | TXC-SG | — | Indicates that MSU transmission should be resumed. |
| MSU | MSU | TXC-SG | — | MSU transmitted |
| FISU | FISU | TXC-SG | — | FISU transmitted. This is really used as a heartbeat between the SG and MG. |
| Send LSSU | SEND-LSSU | TXC-SG | — | Indication to send one of the following LSSU on link: (SIB - Busy) (SIOS - Out-of-service) (SIPO - Processor Outage) (SIO - Out of alignment) (SIE - Emergency) (SIN - Normal) |

DAEDT (Delimitation, Alignment, Error Detection Transmit) block 410 provides functionality necessary for the transmission of conventional MTPL2 compliant messages from an MG 22 to an SSP 12 over link 14. Similar to many of the other blocks, DAEDT 410 has two states: IDLE and IN-SERVICE. When in the IDLE state, DAEDT 410 generates and transmits 7Eh flags onto link 14. When IN-SERVICE, that is when a signal is transmitted to DAEDT 410 from TXC-MG 408, DAEDT 410 will, after generating check-bits, inserting zeros, and generating and inserting flags between signalling units, transmit an SS7 signalling unit complying with conventional MTPL2 which has been generated from the FISU, LSSU or MSU received from TXC-MG 408, to a network element, such as an SSP 12.

CC (Congestion Control) block 422, as is known by those skilled in the art, monitors the number of signaling units waiting to be processed by MTPL3 36.

AERM (Alignment Error Rate Monitor) block 414 of MG 22 generally provides error monitoring tasks (using, for example, a "leaky bucket" algorithm), in co-operation with DAEDR 402, under control of IAC block 430 of SG 24. A signal flow diagram for AERM block 414 is illustrated in FIG. 8. AERM 414 has two states: IDLE and MONITORING. In the IDLE state AERM 414 lies dormant and provides no functions. In the MONITORING state, AERM 414 monitors the number of signaling unit errors detected by DAEDR 402. If too many errors (determined based on a stored parameter which may be changed by an operator of VoIP switch 20—FIG. 3) are detected, an ABORT message is relayed to IAC 430.

The transition of AERM 414 from IDLE to MONITORING is instigated by a START-AM message received from IAC 430. The reverse transition, from MONITORING to IDLE, results from a STOP-AM message received by AERM 414 from IAC 430. IAC 430 may also transmit an EMERGENCY message to AERM 430, indicating that the alignment between a link 14 and SG 24 is in an emergency mode. If IAC 430 sends an EMERGENCY message, IAC 430 will set also an internal counter ($T_i$) equal to an emergency counter ($T_{ie}$) which defines the parameters in the emergency testing or proving period. If the number of errors in signaling units received by MG 22 and detected by AERM 430 exceed the value of counter $T_i$ (which has been previously set equal to $T_{ie}$) during the emergency proving or testing period (the emergency proving period being defined by the timer $P_e$—described in greater detail below), AERM 430 will issue an ABORT message to IAC 430. AERM 430 may also receive from LSC 428 a NORMAL message indicating that SG 24 is operating in normal alignment mode. In response to the reception of a NORMAL message, AERM 414 will set the $T_i$ parameter to $T_{in}$. If AERM 414 identifies, during the NORMAL proving or testing period (defined by the time $P_n$ also described in greater detail below), a quantity of signaling unit errors greater than the $T_i$ parameter, AERM 414 will issue the ABORT message to IAC 430. The values for $T_i$ in an EMERGENCY proving period may be, for example, set to single error detected over a short period, such as, for example, 0.7 s. For NORMAL operation, the number of detected errors allowed before triggering an ABORT message may be much greater, such as for example, for signaling unit errors, over a longer period, such as, for example, 2.4 s. A summary of the messages, the signal source or signal destination of the message (i.e., an entry in the Signal Source column indicates that the entered block transmits the associated signal message to AERM block 414 while an entry in the Signal Destination column indicates that AERM block 414 transmits the associated signal message to the entered block) and information about the purpose of the message is found in Table 6.

TABLE 6

AERM Block 414 Message Table

| Message | MSG ID | Signal Source | Signal Destination | Comments |
|---|---|---|---|---|
| Start AM (Alignment Monitor) | START-AM | IAC | — | IAC starts the error monitor when entering into alignment. |
| Stop AM (Alignment Monitor) | STOP-AM | IAC | — | IAC stops the error monitoring. |
| Emergency | EMERGENCY | IAC | — | Indicates Emergency alignment mode. Set $T_i$ to $T_{ie}$ which is equal to one signal unit in error in the proving period. |
| Normal | NORMAL | LSC | — | Indicates Normal alignment mode. Set $T_i$ to $T_{in}$ which is equal to four signal units in error in the proving period. |
| Abort Proving | ABORT | — | IAC | Abort proving if sent when number of errors = $T_i$. |
| Correct SU | CORRECT-SU | — | IAC | In the data links 14, this signal is generated by DAEDR, however AERM should really be sending it and should only send one when it has been started since IAC is only waiting for one. |

SUERM (Signalling Unit Error Rate Monitor) block 412 also has two modes of operation: IDLE, wherein no functions are performed; and IN-SERVICE, wherein SUERM block 412 monitors the number of errors detected by DAEDR block 402. A signal flow diagram for SUERM block 412 is illustrated in FIG. 5. SUERM 412 transitions from IDLE to IN-SERVICE on receipt of a START-EM message from LSC 428. The reverse transition, from IN-SERVICE to IDLE, results from the receipt of a STOP-EM message also transmitted by LSC 428. If SUERM 412 detects too many errors on link 14 (an error having been determined by DAEDR 402), SUERM transmits a LINK-FAIL message to LSC 428 indicating this condition. Moreover, the connection between MG 22 and link 14 is also brought down. A summary of the messages, the signal source or signal destination of the message (i.e., an entry in the Signal Source column indicates that the entered block transmits the associated signal message to SUERM block 412 while an entry in the Signal Destination column indicates that SUERM block 412 transmits the associated signal message to the entered block) and an explanatory comment for each message is found in Table 7.

TABLE 7

SUERM Block 412 Message Table

| Signal | MSGID | Signal Source | Signal Destination | Comments |
|---|---|---|---|---|
| Start EM (Error Monitor) | START-EM | LSC | — | Start Error monitoring by SUERM. |
| Stop EM (Error Monitor) | STOP-EM | LSC | — | Stop Error monitoring by SUERM. |
| Link Failure | LINK-FAIL | — | LSC | Generated by SUERM when too many errors are detected on the signaling link. |

BERT (Bit Error Rate Testing) block 404 generally performs the procedures for testing and maintaining SS7 links as described in T1.111.17. Similar to other blocks, BERT 404 has two states: IDLE, where no functions performed; and IN-SERVICE. A transition from IDLE to IN-SERVICE results from the reception of a START-BERT message received by BERT 404 from LSC 428. A reverse transition, from IN-SERVICE to IDLE, results from the reception by BERT 404 of a STOP-BERT transmitted by LSC 428. Upon receipt of a STOP-BERT message, BERT 404 will return a ACK-STOP-BERT, which will include the results of error testing. Error testing of messages sent between SG 24 and MG 22, or between MG 22 and an SSP 12 (FIG. 3), may be performed by establishing a loopback system. A "local" loopback will be established between SG 24 and MG 22 upon receipt of a LOCAL-LOOP message at BERT 404 which has been issued by LSC 428. The signalling units used in the local loopback will be issued by SG 24, received by MG 22 and returned. "Remote" loopbacks, conducted between MG 22 and link 14, can also be established by the reception of a REM-LOOP message issued by LSC 428. LSC 428 will periodically request, by the issuance of a STATUS-BERT message, the status of the BERT testing. Generally, during testing, MG 22, through operation of BERT 404, will transmit BERT testing results to SG 24 on a periodic basis, such as, every 5 seconds. A summary of the messages, the signal source or signal destination of the message (i.e., an entry in the Signal Source column indicates that the entered block transmits the associated signal message to BERT block 404 while an entry in the Signal Destination column indicates that BERT block 404 transmits the associated signal message to the entered block) and comments about the message is found in Table 8.

TABLE 8

BERT Block 404 Message Table

| Signal | MSG ID | Signal Source | Signal Destination | Comments |
|---|---|---|---|---|
| Start BERT | START-BERT | LSC | — | |
| Stop BERT | STOP-BERT | LSC | — | The acknowledge for this message will also return the result of the test. |
| Status BERT | STATUS-BERT | — | LSC | Periodically output the status of the BERT test. The MG may return the test status to the SG every 5 seconds while the test is running. |
| Local Loopback | LOCAL-LOOP | LSC | — | Establish local loopback between SG 24 and MG 24 (SG 24 sends the SUs) |
| Remote Loopback | REM-LOOP | LSC | IN | Start Remote Loopback which loops data at conventional MTPL2 between MG 22 and link 14. |

OM-MG block 416 (of MG 22) and OM-SG 424 (of SG 24) provide general operational management support for VoIP switch 20 (FIG. 4). OM-MG 416 records OMs about the signals received by MG 22 and uploads these messages, when requested by OM-SG 424 via a OM-START message, to SG 24. Once the OM signal units are uploaded to SG 24, via an OM-DATA message generated by OM-MG 416, the OM signal units are cleared. A summary of the messages, the signal source or signal destination of the message (i.e., an entry in the Signal Source column indicates that the entered block transmits the associated signal message to OM-MG block 416 while an entry in the Signal Destination column indicates that OM-MG block 416 transmits the associated signal message to the entered block) and general comments regarding the messages is found in Table 9.

TABLE 9

OM-MG Block 416 Message Table

| Signal | MSG ID | Signal Source | Signal Destination | Comments |
|---|---|---|---|---|
| OM Upload Start | OM-START | OM-SG | — | Start upload of OM data from OM-MG that is to be transmitted to OM-SG |
| OM Data | OM-DATA | — | OM-SG | Will return all OMs kept on the MG. |

As mentioned previously, a number of timers are used during the operation of VoIP switch 20 (FIG. 3). These timers are mostly resident on SG 24 with a few timers also existing on MG 22. A list of the timers and their purpose is include in Table 10.

TABLE 10

Timers on SG 24

| Timer Name | Duration (Exemplary Only) | Purpose |
|---|---|---|
| $T_1$ | 13.1 sec. | Started when LSC 428 enters the Aligned/Ready state waiting for a valid FISU/MSU from SSP 12. |
| $T_2$ | 11.6 sec. | Started when IAC 430 enters the Not Aligned state and it is waiting for SIO, SIN or SIE from SSP 12. |
| $T_3$ | 11.6 sec. | Started when IAC 430 enters the Aligned state waiting for SIE or SIN. |
| $P_n$ | 2.4 sec. | Started when IAC 430 enters proving period for normal alignment. |
| $P_e$ | 0.7 sec. | Started when IAC 430 enters proving period for emergency alignment. |
| $T_5$ | 0.2 sec. | Started when CC 422 enters the Level 2 Congestion state and specifies the interval SIBs are sent while in congestion. |
| $T_6$ | 3.1 sec. | Started when SIB are received by TXC-SG. Link is taken down if remote congestion last too long. |
| $T_7$ | 0.6 sec. | Used by TXC-SG to time acknowledgements from far-end. If no ACK is received in a period of $T_7$, link is taken down (excessive delay of acknowledgement). |
| $T_{SUERM}$ | 1.0 sec. | This timer is not used presently. |
| $T_{RTV}$ | 0.2 sec. | Implementation dependent timer started when messages are still awaiting confirmation from driver. |
| $T_{ACK}$ | 1.0 sec. | Timer started indicating how long to wait for an ACK (used by both the SG 24 and MG 22). If an ACK is not received in $T_{ACK}$, the message is retransmitted. Two timeouts in a row will cause the SG 24 or MG 22 to take the link down. |
| $T_{SANITY}$ | 1 sec. | Timer used at RC-MG 406 to periodically send the LSSU or FISU received by RC-SG 420 when no new messages are being received from the link. This timer is also used at RC-SG 420 to monitor that RC-MG 406 is periodically sending SUs. Failure to receive SUs from the MG 22 during two $T_{SANITY}$ periods will cause the SG 24 to take down the link. This timer is also used at TXC-SG 426 to periodically send the proper LSSU or FISU to the TXC-MG 408 when no new SUs need to be transmitted. This timer is also used by TXC-MG 408 to verify that it is receiving SUs from TXC-SG 426. Failure to receive an SU from the SG during two consecutive $T_{SANITY}$ periods will cause MG 22 to take down the link. This implies that when the link is idle, the SG 24 and MG 22 will still exchange a message every $T_{SANITY}$ seconds. |

In an alternative embodiment communications links 28 (FIG. 3) and network 30 (FIG. 4) over which communication between MGs 22, SG 24 and MGC 26 takes place could, instead of an IP network, be another type of routed or switched packet network.

While the MGs 22 and SG 24 of exemplary embodiment disclosed separate the functions of UL-MTPL2 block 34 and LL-MTPL2 block 32 as existing on separately on SG 24 and MG 22, respectively, an alternative embodiment falling within the scope of the present invention combines the functions of UL-MTPL2 block 34 and LL-MTPL2 32 on a single component of VoIP switch 20, such as MGs 22. Accordingly, the same functionality, including a fully associated network, of the exemplary embodiment would be maintained but without requiring any SGs 24.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

We claim:

1. A method providing distributed Message Transfer Part (MTP) functionality over an Internet Protocol (IP) network, said method comprising:

at a first media gateway:
   receiving conventional MTP signaling units from a first network element;
   removing repeated MTP signaling units from said MTP signaling units received;
   either before or after said removing, encapsulating received MTP signaling units into data packets to form a reduced signaling unit packet stream; and
   transmitting said reduced signaling unit packet stream to a signaling gateway;
   receiving at said signaling gateway said reduced packet stream at said signaling gateway;
   transmitting packets encapsulating MTP signaling units to one of said first media gateway and a second media gateway, said transmitted packets being responsive to said received reduced signaling unit packet stream;
   receiving at said one of said first media gateway and said second media gateway said packets transmitted by said signaling gateway; and
   at said one of said first media gateway and said second media gateway, re-creating conventional MTP signaling units based on said routed packets and transmitting said re-created conventional MTP signaling units to one of said first network element and a second network element.

2. The method of claim 1 wherein each of said packets comprises:

a packet header;
   a Message Transfer Part Level 2 (MTPL2) header;
   a distributed level two protocol header; and
   a payload, said payload corresponding to conventional MTPL2 signaling units.

3. The method of claim 2 wherein each of said packets is an Internet Protocol (IP) and said packet header comprises:

an IP header; and
   a UDP header.

4. The method of claim 3 wherein said each of said IP packets further comprises:

a length indicator indicating the length of the entire IP packet; and
   a checksum field generated based on the uncorrupted values stored in the IP packet.

5. The method of claim 3 wherein said IP header comprises a source IP address and a destination IP address and said UDP header comprises a UDP header length indicator, a source port field, a destination port field and a length indicator indicating the length of said each of said IP packets.

6. A Voice over Internet Protocol (VoIP) switch providing a distributed Message Transfer Part Level 2 (MTPL2) protocol, said VoIP switch comprising:

a plurality of media gateways, each of said media gateways in communication with a conventional SS7 physical link, said conventional SS7 physical link in communication with a network element, each of said media gateways further comprising:
   an SS7 receiver receiving conventional SS7 signaling units and interfacing with said conventional physical link;
   an SS7 transmitter for transmitting conventional SS7 signaling units from said media gateway to a network element over said conventional physical link;
   an IP transmitter for forming and transmitting IP packets corresponding to conventional SS7 signaling units complying with Message Transfer Part Level Two (MTPL2) protocol, said IP packets being transmitted over said IP network to said signaling gateway; and
   an IP receiver for receiving IP packets corresponding to conventional SS7 signaling units complying with said MTPL2 protocol, said IP packets being received from said IP network from said signaling gateway;
   a signaling gateway, said signaling gateway comprising:
   an IP transmitter for routing IP packets corresponding to conventional SS7 signaling units complying with Message Transfer Part Level Two (MTPL2) protocol, said IP packets being transmitted over said IP network to one of said media gateways;
   an IP receiver for receiving IP packets corresponding to conventional SS7 signaling units complying with said MTPL2 protocol, said IP packets being received from said IP network from one of said media gateways; and
   a controller controlling the functions of said signaling gateway and said media gateways; and
   an IP network providing IP communication between said plurality of media gateways and said signaling gateway.

7. The VoIP switch of claim 6 wherein each of said media gateways further comprises a processor, said processor adapted to:

generate IP packets encapsulating signaling units received by said SS7 receiver; and
   generate conventional SS7 signaling units responsive to IP packets received by said IP receiver.

8. The VoIP switch of claim 7 wherein said IP packets generated by said processor comprise:

an IP header;
   a UDP header;
   a distributed level two protocol header;
   a Message Transfer Part Level 2 (MTPL2) header; and
   a payload, said payload corresponding to a conventional SS7 signaling unit.

9. The VoIP switch of claim 8 wherein said stream has a length such that for a stream of identical Fill-In Signaling Units (FISUs) or Link Status Signal Units (LSSUs) greater than said length one signaling unit is sent in an IP packet periodically.

10. The VoIP switch of claim 8 wherein said processor is further adapted to, for a data stream formed of a plurality of identical Fill-In Signaling Units (FISUs) or for a data stream formed from a plurality of identical Link Status Signal Units (LSSUs) received from said SS7 receiver, encapsulate only one signaling unit in an IP packet representative of said contiguous stream for transmission between said media gateway and said signaling gateway.

11. The VoIP switch of claim 10 wherein said processor is further adapted to, for an IP packet representative of a contiguous stream of FISUs or LSSUs received by said IP receiver, generate a plurality of identical conventional SS7 signaling units representative of said FISUs or LSSUs received from said SS7 receiver in response to an instruction received from said signaling gateway, said plurality of conventional signaling units transmitted by said SS7 transmitter of said media gateway.

* * * * *